United States Patent
Wooldridge et al.

(10) Patent No.: US 10,037,017 B2
(45) Date of Patent: Jul. 31, 2018

(54) METHOD OF MEASUREMENT ON A MACHINE TOOL AND CORRESPONDING MACHINE TOOL APPARATUS

(71) Applicant: RENISHAW PLC, Wotton-under-Edge, Gloucestershire (GB)

(72) Inventors: Michael Wooldridge, Stroud (GB); Paul Moore, Stroud (GB); John Ould, Backwell Farleigh (GB)

(73) Assignee: RENISHAW PLC, Wotton-Under-Edge (GB)

( * ) Notice: Subject to any disclaimer, the term of this patent is extended or adjusted under 35 U.S.C. 154(b) by 648 days.

(21) Appl. No.: 14/391,950

(22) PCT Filed: Apr. 16, 2013

(86) PCT No.: PCT/GB2013/050968
§ 371 (c)(1),
(2) Date: Oct. 10, 2014

(87) PCT Pub. No.: WO2013/156769
PCT Pub. Date: Oct. 24, 2013

(65) Prior Publication Data
US 2015/0066196 A1   Mar. 5, 2015

Related U.S. Application Data

(60) Provisional application No. 61/720,293, filed on Oct. 30, 2012.

(30) Foreign Application Priority Data

Apr. 18, 2012  (EP) ...................................... 12250096

(51) Int. Cl.
*G05B 19/401* (2006.01)
*G01B 21/04* (2006.01)

(52) U.S. Cl.
CPC ......... *G05B 19/401* (2013.01); *G01B 21/045* (2013.01); *G05B 2219/50063* (2013.01)

(58) Field of Classification Search
None
See application file for complete search history.

(56) References Cited

U.S. PATENT DOCUMENTS 4,084,323 A   4/1978  McMurtry
4,153,998 A   5/1979  McMurtry
(Continued)

FOREIGN PATENT DOCUMENTS

CN   85105480 A   1/1987
CN   1009221 B    8/1990
(Continued)

OTHER PUBLICATIONS

Jan. 26, 2017 Office Action issued in Chinese Application No. 201380027017.X.
(Continued)

*Primary Examiner* — Isaac T Tecklu
(74) *Attorney, Agent, or Firm* — Oliff PLC

(57) ABSTRACT

A method of scanning an object using an analog probe mounted on a machine tool, so as to collect scanned measurement data along a nominal measurement line on the surface of the object, the analog probe having a preferred measurement range. The method includes controlling the analog probe and/or object to perform a scanning operation in accordance with a course of relative motion, the course of relative motion being configured such that, based on assumed properties of the surface of the object, the analog probe will be caused to obtain data within its preferred measuring range, as well as cause the analog probe to go outside its preferred measuring range, along the nominal measurement line on the surface of the object.

19 Claims, 6 Drawing Sheets

(56) References Cited

U.S. PATENT DOCUMENTS

Figure 1:
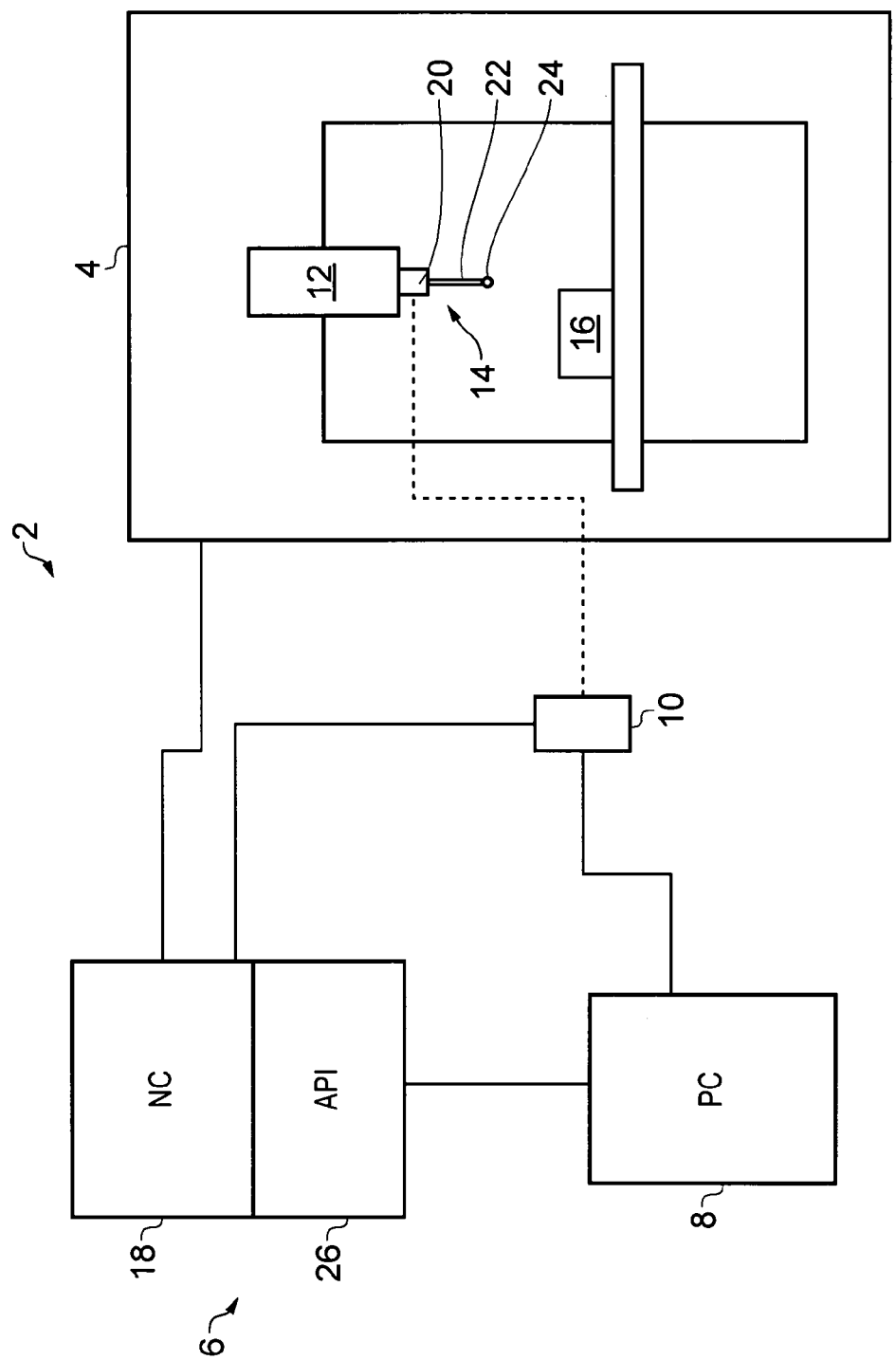

| | | | |
|---|---|---|---|
| 4,166,323 A | 9/1979 | Maag | |
| 4,799,170 A | 1/1989 | Nakaya et al. | |
| 4,991,304 A * | 2/1991 | McMurtry | G01B 21/045 33/1 M |
| 5,115,401 A | 5/1992 | Oyama et al. | |
| 5,189,806 A * | 3/1993 | McMurtry | G01B 21/04 33/503 |
| 5,428,548 A * | 6/1995 | Pilborough | B23Q 17/20 33/504 |
| 5,471,406 A | 11/1995 | Breyer et al. | |
| 6,580,964 B2 * | 6/2003 | Sutherland | G01B 21/042 700/193 |
| 7,100,430 B2 * | 9/2006 | Samsavar | B82Y 35/00 73/105 |
| 7,146,291 B2 | 12/2006 | Hough | |
| 7,165,335 B2 | 1/2007 | McMurtry | |
| 7,254,506 B2 * | 8/2007 | McMurtry | G01B 21/045 33/502 |
| 7,293,365 B2 | 11/2007 | McMurtry et al. | |
| 7,318,284 B2 | 1/2008 | McMurtry et al. | |
| 7,523,561 B2 * | 4/2009 | McFarland | G01B 21/04 33/554 |
| 7,543,393 B2 | 6/2009 | McMurtry et al. | |
| 7,752,000 B2 | 7/2010 | Schulze et al. | |
| 7,866,056 B2 * | 1/2011 | Ould | G01B 21/042 33/503 |
| 7,886,453 B2 * | 2/2011 | Ould | G01B 21/042 33/503 |
| 7,900,367 B2 | 3/2011 | Sutherland | |
| 8,006,398 B2 * | 8/2011 | McFarland | G01B 21/045 33/503 |
| 8,006,402 B2 | 8/2011 | Yoshizumi et al. | |
| 8,756,973 B2 | 6/2014 | Wallace et al. | |
| 8,991,246 B2 * | 3/2015 | Hirono | G01B 5/008 33/503 |
| 9,366,519 B2 * | 6/2016 | Danbury | G01B 5/008 |
| 9,400,178 B2 | 7/2016 | Marshall et al. | |
| 9,726,481 B2 | 8/2017 | McMurtry et al. | |
| 9,733,060 B2 | 8/2017 | Ould et al. | |
| 2001/0047682 A1 | 12/2001 | Samsavar et al. | |
| 2003/0019119 A1 | 1/2003 | Sato et al. | |
| 2004/0244464 A1 | 12/2004 | Hajdukiewicz et al. | |
| 2005/0005688 A1 * | 1/2005 | Samsavar | B82Y 35/00 73/105 |
| 2005/0194534 A1 | 9/2005 | Kneedler et al. | |
| 2005/0263727 A1 * | 12/2005 | Noda | G01B 5/008 250/559.29 |
| 2007/0050089 A1 | 3/2007 | Sun et al. | |
| 2008/0021672 A1 * | 1/2008 | Powley | G01B 5/008 702/158 |
| 2008/0051927 A1 * | 2/2008 | Prestidge | G05B 19/401 700/195 |
| 2008/0249737 A1 | 10/2008 | Jordil et al. | |
| 2008/0271332 A1 * | 11/2008 | Jordil | G01B 5/008 33/503 |
| 2009/0025463 A1 * | 1/2009 | McFarland | G01B 21/045 73/104 |
| 2009/0198472 A1 * | 8/2009 | Nemoto | G01B 3/008 702/152 |
| 2009/0235547 A1 * | 9/2009 | Hellier | G01B 21/04 33/503 |
| 2009/0307916 A1 * | 12/2009 | McLean | G01B 21/04 33/503 |
| 2010/0050837 A1 * | 3/2010 | Ould | G01B 21/042 83/14 |
| 2010/0119104 A1 * | 5/2010 | Mamour | G01B 5/0032 382/100 |
| 2010/0132207 A1 * | 6/2010 | Mamour | G01B 5/0014 33/503 |
| 2011/0055982 A1 * | 3/2011 | Watanabe | G01Q 10/04 850/2 |
| 2011/0184695 A1 | 7/2011 | Grzesiak | |
| 2011/0264402 A1 | 10/2011 | Anderson et al. | |
| 2011/0276303 A1 | 11/2011 | Marshall et al. | |
| 2011/0283553 A1 | 11/2011 | McFarland et al. | |
| 2012/0150354 A1 * | 6/2012 | Rogers | G05B 19/4015 700/279 |
| 2013/0304250 A1 * | 11/2013 | McMurtry | G01B 5/012 700/195 |
| 2015/0101204 A1 | 4/2015 | Ould et al. | |

FOREIGN PATENT DOCUMENTS

| | | |
|---|---|---|
| CN | 1392950 A | 1/2003 |
| CN | 1474159 A | 2/2004 |
| CN | 1695036 A | 11/2005 |
| CN | 1727871 A | 2/2006 |
| CN | 101166951 A | 4/2008 |
| CN | 100437027 C | 11/2008 |
| CN | 100476348 C | 4/2009 |
| CN | 101622513 A | 1/2010 |
| CN | 101669009 A | 3/2010 |
| CN | 102197274 A | 9/2011 |
| CN | 102305613 A | 1/2012 |
| DE | 19730471 A1 | 2/1999 |
| EP | 0 588 512 A1 | 3/1994 |
| EP | 1 260 789 A2 | 11/2002 |
| EP | 2102589 B1 | 3/2010 |
| GB | 2302589 A | 1/1997 |
| JP | H02-145908 A | 6/1990 |
| JP | H10-31084 A | 2/1998 |
| JP | 2005-345123 A | 12/2005 |
| JP | 2005-345165 A | 12/2005 |
| JP | 2005-537474 A | 12/2005 |
| JP | 2009-293992 A | 12/2009 |
| JP | 2010-513042 A | 4/2010 |
| JP | 2010-537184 A | 12/2010 |
| JP | 2012-011544 A | 1/2012 |
| TW | 200537070 | 11/2005 |
| TW | 200951464 A1 | 12/2009 |
| TW | 201111100 A1 | 4/2011 |
| WO | 90/007097 A1 | 6/1990 |
| WO | 92/020996 A1 | 11/1992 |
| WO | 03/012561 A2 | 2/2003 |
| WO | 2005/028996 A1 | 3/2005 |
| WO | 05/031254 A1 | 4/2005 |
| WO | 05/065884 A2 | 7/2005 |
| WO | 2006/003380 A1 | 1/2006 |
| WO | 2006/013387 A2 | 2/2006 |
| WO | 06/115923 A2 | 11/2006 |
| WO | 06/115923 A3 | 11/2006 |
| WO | 08/074989 A1 | 6/2008 |
| WO | 2009/010721 A1 | 1/2009 |
| WO | 12/037059 A1 | 3/2012 |

OTHER PUBLICATIONS

Dec. 27, 2016 Office Action issued in Japanese Application No. 2015-506299.
Jul. 12, 2016 Office Action Issued in U.S. Appl. No. 14/391,837.
"TRACECUT Powerful Software for the Mould and Die Industry," Renishaw Data Sheet H-2000-2293-04-A.
"RENSCAN Retrofit 'Closed Loop' Scanning System for Machine Tools," Renishaw Data Sheet Part No. H-2000-2068-03-A.
"RENSCAN 200 A Fast Retrofit Scanning System for Machine Tools," Renishaw Data Sheet Part No. H-2000-2068-PA.
Apr. 7, 2015 Office Action issued in Taiwanese Application No. 102113861.
Apr. 20, 2015 Office Action issued in Taiwanese Application No. 102113862.
Aug. 8, 2014 Office Action and Search Report issued in Taiwanese Application No. 102113862.
"Scanning Systems for Reverse Engineering". Renishaw PLC. 1999.
"Installation Guide Renscan 200—Scanning System for Machine Tools". Renishaw PLC. 1997.
"Installation Guide Retroscan—Scanning System for Machine Tools". Renishaw PLC. 1996.

(56) References Cited

OTHER PUBLICATIONS

Jul. 2, 2015 Office Action issued in Taiwanese Patent Application No. 102113860.
U.S. Appl. No. 14/391,837 in the name of McMurtry et al., filed Oct. 10, 2014.
U.S. Appl. No. 14/391,822 in the name of Ould et al., filed Oct. 10, 2014.
Lee, K. H. et al. "A Framework for Laser Scan Planning of Freeform Surfaces." International Journal of Advanced Manufacturing Technology. vol. 17, pp. 171-180, 2001.
Elkott, Diaa et al. "Isoparametric line sampling for the inspection planning of sculptured surfaces." Computer-Aided Design. vol. 37, pp. 189-200, 2005.
Fernandez, Pedro et al. "Laser scan planning based on visibility analysis and space partitioning techniques." International Journal of Advanced Manufacturing Technology. vol. 39, pp. 699-715, 2008.
Jul. 17, 2012 Search Report issued in European Application No. 12 25 0093.
Jul. 25, 2013 International Search Report and Written Opinion issued in PCT Application No. PCT/GB2013/050964.
Sep. 1, 2014 Office Action issued in Taiwanese Application No. 102113860.
Jul. 18, 2012 Search Report issued in European Application No. 12 25 0095.
Jul. 25, 2013 International Search Report and Written Opinion issued in PCT Application No. PCT/GB2013/050966.
Sep. 1, 2014 Office Action issued in Taiwanese Application No. 102113861.
Jul. 25, 2013 International Search Report and Written Opinion issued in PCT Application No. PCT/GB2013/050968.
Jul. 19, 2012 Search Report issued in European Application No. 12 25 0096.
Jul. 28, 2016 Office Action issued in Chinese Application No. 201380024172.2.
Dec. 22, 2016 Office Action issued in Chinese Application No. 201380031456.8.
Dec. 13, 2016 Office Action issued in U.S. Appl. No. 14/391,822.
Juanjuan Dang, Xi'an Technological University, Master's Degree Thesis; Subject: Optical Surface Sublayer Damage Characterisation Research, May 3, 2011, pp. 23-25.
Jun. 23, 2016 Office Action Issued in U.S. Appl. No. 14/391,822.
Feb. 14, 2017 Office Action issued in Japanese Patent Application No. 2015-506298.
Mar. 28, 2017 Office Action issued in European Patent Application No. 13 719 596.2.
Feb. 14, 2017 Office Action issued in Japanese Patent Application No. 2015-506301.
Jun. 1, 2017 Office Action issued in Chinese Patent Application No. 201380024772.2.
Nov. 14, 2017 Office Action issued in Japanese Application No. 2015-506298.
Nov. 17, 2017 Office Action Issued in U.S. Appl. No. 15/605,377.
Sep. 26, 2017 Office Action issued in Chinese Application No. 201380027017.X.
Oct. 31, 2017 Office Action issued in Japanese Application No. 2015-506301.
Dec. 20, 2017 Office Action issued in Chinese Patent Application No. 201380031456.8.
Apr. 30, 2018 Office Action issued in Taiwanese Application No. 102113860.

\* cited by examiner

METHOD OF MEASUREMENT ON A MACHINE TOOL AND CORRESPONDING MACHINE TOOL APPARATUS

This invention relates to a method of measuring an artefact, and in particular to a method of scanning an artefact using an analogue measurement tool mounted on a machine tool.

It is known to mount a measurement probe in a machine tool spindle, for movement with respect to a workpiece, in order to measure the workpiece. In practice, the probe has typically been a touch trigger probe, e.g. as described in U.S. Pat. No. 4,153,998 (McMurtry), which produces a trigger signal when a stylus of the probe contacts the workpiece surface. This trigger signal is taken to a so-called "skip" input of the machine tool's numeric controller (NC). In response, relative movement of the object and workpiece are stopped and the controller takes an instantaneous reading of the machine's position (i.e. the position of the spindle and the probe relative to the machine). This is taken from measurement devices of the machine such as encoders which provide position feedback information in a servo control loop for the machine's movement. A disadvantage of using such a system is that the measurement process is relatively slow resulting in long measurement times if a large number of measurement points are required.

Analogue measurement probes (also commonly known as scanning probes) are also known. Contact analogue probes typically comprise a stylus for contacting the workpiece surface, and transducers within the probe which measure the deflection of the stylus relative to the probe body. An example is shown in U.S. Pat. No. 4,084,323 (McMurtry). In use, the analogue probe is moved relative to the surface of the workpiece, so that the stylus scans the surface and continuous readings are taken of the outputs of the probe transducers. Combining the probe deflection output and the machine position output allows co-ordinate data to be obtained thereby allowing the position of the workpiece surface to be found at a very large number of points throughout the scan. Analogue probes thus allow more detailed measurements of the form of the workpiece surface to be acquired than is practically possible using a touch trigger probe.

As will be understood (and explained in more detail below in connection with FIG. 2), an analogue probe has a limited measurement range. Furthermore, the analogue probe might have a preferred measurement range. The analogue probe might be able to obtain data outside its preferred measurement range, but the data obtained outside this range could be less preferred, for instance because it could be considered to be less accurate than the data obtained within the preferred measuring range. The boundaries of the preferred measurement range can vary depending on many different factors, including the type of probe, the calibration routine used, and even for instance the object being measured. In many circumstances it can be preferred to ensure that the analogue probe is kept within its preferred measurement range as it scans along the surface of the workpiece. The preferred measurement range of an contact analogue probe can be for example +/−0.8 mm in any given dimension or smaller, for example in some circumstances as small as +/−0.3 mm in any given dimension. (These values could be measured from the stylus' rest position). Furthermore, the actual preferred measurement range could be even smaller than the figures given above because it might be that a minimum amount of deflection could be needed to enter the preferred measuring range. Accordingly, although the preferred measuring range might be +/−0.5 mm from the rest position, at least the first +/−0.05 mm of deflection or for example the first +/−0.1 mm of deflection might not be within the preferred measuring range (again, this is explained in more detail below in connection with FIG. 2). Accordingly, as will be understood, real-time management of the probe/workpiece positional relationship is required to avoid situations in which the analogue probe falls outside its preferred measurement range.

This is why analogue probes have typically only been used with dedicated co-ordinate measuring machines (CMMs) even though analogue probes have been known per se for many years. This is because CMMs have dedicated real-time control loops to enable such management of probe deflection to occur. In particular, in CMMs a controller is provided into which a program is loaded which defines a predetermined course of motion for the measurement probe to move along relative to a workpiece. The controller generates motor control signals from the program which are used to activate motors to induce movement of the measurement probe. The controller also receives real-time position data from the machine's encoders and also deflection data (in the case of a contact probe) from the analogue probe. In order to accommodate for variations in the material condition of the workpiece a dedicated control loop arrangement exists. This comprises a feedback module into which the above mentioned motor control signals and deflection data are fed. The feedback modules uses logic to continuously update (based on the deflection data) an offset control vector which in turn is used to adjust the above mentioned motor control signal generated from the program before it is sent to the CMM's motors so as to try to maintain probe deflection within the preferred measuring range as the analogue probe scans the workpiece. This all happens within a closed loop control loop with a response time of less than 1 to 2 ms. This is for example described in WO2006/115923.

Such tight control over probe positioning plus the ability to process real-time stylus deflection data allows such dedicated CMMs to scan complex articles that deviate from their expected shape and even to scan articles of unknown shape.

To date, analogue probes have not been widely used for machine tool scanning applications. This is due to the inherent nature of many commercially available machine tools which do not facilitate the real-time control of the analogue probe that CMMs provide. This is because machine tools are primarily developed to machine workpieces and the use of measurement probes on them to measure workpieces is essentially an after-thought. Machine tools are therefore typically not configured for real-time control using data from an analogue measurement probe. Indeed, it is often the case that the machine tool has no in-built provision for the direct receipt of deflection data from the measurement probe. Rather, the probe has to communicate (e.g. wirelessly) with an interface which receives the probe deflection data and passes the data to a separate system which subsequently combines the deflection data with machine position data so as to subsequently form complete object measurement data, for instance as described in WO2005/065884.

This makes it difficult to use an analogue probe on a machine tool to obtain scanned measurement data about known objects, because any variation from the expected shape of the object can cause the probe to over deflect and hence cause the measurement process to fail (whereas on a CMM the probe's course of motion could be updated quickly enough to ensure that the probe doesn't over deflect). This also makes it difficult to use an analogue probe on a machine tool to obtain scanned measurement data about unknown objects because this inherently requires the probe's course of motion to be updated quickly enough so as to avoid over deflection.

Techniques for overcoming the problems of using an analogue scanning probe on a machine tool have been developed. For instance, drip feed techniques are known in which the program instructions are loaded into the machine tool's controller in a drip fed manner. In particular, each instruction causes the probe to move by a tiny distance (i.e. less than the probe's preferred deflection range), and the probe's output is analysed to determine the extent of deflection, which in turn is used to generate the next instruction to be fed into the controller. However, such a technique is still much more limited than the scanning techniques that can be performed using an analogue scanning probe on a CMM. In particular, such a method is very slow and inefficient.

WO2008/074989 describes a process for measuring a known object which involves repeating a measurement operation according to an adjusted path if a first measurement operation resulted in over or under deflection.

The problem can also be further compounded when using analogue probes on machine tools because due to their construction (which enables them to be able to used within the harsher environments that machine tools provide and the greater accelerations and forces they are exposed to such as when they are auto-changed into/out of a machine tool's spindle) they often have a much smaller measurement range than those analogue probes which are for use with CMMs. This can therefore give even less room for error compared to analogue probes used on CMMs. For example, a machine tool analogue probe could have a measurement range of +/−0.8 mm in any given dimension or smaller (measured from the stylus' rest position), for example in some circumstances +/−0.5 mm in any given dimension or smaller, and for example in some circumstances no bigger than +/−0.3 mm in any given dimension. This can therefore give even less room for error compared to analogue probes used on CMMs. As mentioned above, a minimum deflection might also be required in order to enter the preferred measuring range.

As a specific example, the measurement range could be defined by a maximum deflection 0.725 mm and a minimum deflection of 0.125 mm (measured from the stylus' rest position). Accordingly, in this case, this can mean that the surface can be +/−0.3 mm from nominal whilst maintaining an accurate measurement. However, this figure can be smaller, and for instance it is known to for surface uncertainties to be as small as +/−0.1 mm, which corresponds to a maximum probe deflection of around +/−0.325 mm and a minimum probe deflection of +/−0.125 mm.

According to a first aspect of the invention there is provided, a method of scanning an object using an analogue probe mounted on a machine tool, so as to collect scanned measurement data along a nominal measurement line on the surface of the object, the analogue probe having a preferred measurement range, the method comprising: controlling the analogue probe and/or object to perform a scanning operation in accordance with a course of relative motion, the course of relative motion being configured such that the position of the preferred measuring range relative to the surface of the object is controlled in a manner that, based on assumed properties of the surface of the object, will cause the analogue probe to obtain data within its preferred measuring range, as well as cause the analogue probe to be outside its preferred measuring range, along the nominal measurement line on the surface of the object.

Accordingly, rather than trying to always keep the analogue probe within its preferred measurement range, the present invention therefore works on the basis that it expects the analogue probe to move within and outside its preferred measurement range along the nominal measurement line on the surface of the object. This could be such that it expects the analogue probe to obtain measurements both within and outside its preferred measuring range along the nominal measurement line on the surface of the object. Indeed, the method can be configured such that the position of the analogue probe's preferred measurement range with respect to the surface of the object is controlled such that the analogue probe is caused to deliberately obtain measurements both within and outside its preferred measurement range, along the nominal measurement line on the surface of the object. This can improve the efficiency by which object measurement data is obtained using an analogue probe on a machine tool.

It could be that the course of relative motion is configured such that the position of the preferred measuring range relative to the surface of the object is controlled in a manner that, based on assumed properties of the surface of the object, will cause the analogue probe to obtain data within its preferred measuring range, as well as cause the analogue probe to exceed its preferred measuring range, along the nominal measurement line on the surface of the object. It could be that the course of relative motion is configured such that the position of the preferred measuring range relative to the surface of the object is controlled in a manner that, based on assumed properties of the surface of the object, will cause the analogue probe to obtain data within its preferred measuring range, as well as cause the analogue probe to exceed and or fall-short of its preferred measuring range, along the nominal measurement line on the surface of the object.

The method could be configured such that the course of relative motion is configured such that during the scanning operation, based on assumed properties of the surface of the object, the position of the preferred measuring range relative to the surface of the object in a direction normal to the surface of the object (e.g. the height) varies along the nominal measurement line.

The method can further comprise filtering the data obtained from the analogue probe so as to obtain select scanned measurement data. The method can comprise filtering the data obtained from the analogue probe so as to obtain data relating to scanned measurement data obtained predominantly from either within or from outside the analogue probe's preferred measurement range. The method can comprise filtering the data obtained from the analogue probe so as to obtain select scanned measurement data relating predominantly to scanned measurement data obtained from within the analogue probe's preferred measurement range. The method can comprise filtering the data obtained from the analogue probe so as to obtain select scanned measurement data relating substantially to only scanned measurement data obtained from within the analogue probe's preferred measurement range.

The method can comprise collating said filtered data into a further data set. Accordingly, for instance, the further data set could comprise scanned measurement data relating to the surface of the object that was obtained within the analogue probe's preferred measurement range. The further data set could be output as measurement data of the object.

Accordingly, the method can comprise collecting and outputting scanned measurement data obtained within the analogue probe's preferred measuring range as the measurement of the object. In line with the above, such collecting and outputting can comprise filtering the data obtained from the analogue probe so as to obtain, and provide as the measurement of the object, select object measurement data obtained from within the analogue probe's preferred measurement range.

The preferred measuring range can be less than the total measuring range of the analogue probe. In the case of a contact probe, the preferred measuring range can be less than the total deflection range of the analogue probe. Accordingly, the preferred measuring range could be a subset of the analogue probe's entire measurement range. As mentioned above, the exact boundaries of the preferred measurement range can vary from probe to probe and even from measurement operation to measurement operation for any given probe. It could be the range for which the analogue probe has been calibrated for any given measurement operation, e.g. to give a desired level of accuracy.

The method can comprise generating and executing (e.g. as part of a second scanning operation) a new course of relative movement of the analogue probe and object based on the measurement data obtained during the previous scanning operation. The new course of relative movement can comprise the analogue probe traversing substantially the same line of measurement across the surface of the object. However, in this case the relative movement can be controlled such that the relative position of the analogue probe and object is such that the analogue probe obtains measurements within its preferred measurement range for a greater proportion of the measurement path than for the previous measurement of the object. In particular, the new path of relative movement for the analogue probe and object to follow can be configured such that the analogue probe obtains measurement data within its preferred measurement range along substantially the entire length of the same nominal line.

The object and analogue probe could be configured to move relative to each other along a predetermined path of relative motion so that the analogue probe obtains scanned measurement data along the nominal measurement line on the surface of the object.

The predetermined path of relative motion can be configured such that the analogue probe proceeds in a manner that, based on assumed properties of the surface of the object, causes the position of the analogue probe's preferred measurement range to repeatedly rise and fall relative to the surface of the object as it moves along the nominal measurement line. Accordingly, this could be so as to cause, based on assumed properties of the surface of the object, the analogue probe to oscillate between obtaining data within and outside its preferred measuring range (e.g. under and within, or within and beyond, or under, within and beyond preferred measuring range) along the nominal measurement line. For instance, the predetermined path of relative motion can be configured such that the analogue probe moves in an undulating, sinusoidal or wavy manner as it moves along the nominal measurement line.

The predetermined path of relative motion can be configured such that, based on assumed properties of the surface of the object, the analogue probe is maintained in a position sensing relationship with the surface of the object as it is moved along the nominal measurement line. This could particularly be the case with the above described embodiment in which the predetermined path of relative motion is configured such that the analogue probe proceeds in a manner that, based on assumed properties of the surface of the object, causes the position of the analogue probe's preferred measurement range to repeatedly rise and fall relative to the surface of the object as it moves along the nominal measurement line.

The course of relative motion could be configured such that during the scanning operation the analogue probe's preferred measuring range traverses across the object along the nominal measurement line a plurality of times. The positional relationship of the analogue probe and object can be different for different traverses. The analogue probe can obtain measurement data within different regions of its entire measuring range for different traverses. The form of the route the analogue probe and object take relative to each other can be substantially the same for each traverse such that the object is measured along the nominal measurement line on the surface of the object a plurality of times. However, the position of the analogue probe and object could be offset relative to each other for different traverses.

Accordingly, the course of motion could be configured such that for different traverses the analogue probe obtains measurement data within its preferred measurement range for different parts of the object, along the same nominal measurement line on the surface of the object. The form of the route that the preferred measuring range takes relative to the surface can be substantially the same for successive traverses. Accordingly, the height of the route from the surface at at least one point along the nominal measurement line (and preferably along the entire length of the nominal measurement line) can be different for different traverses. In particular, the traverses can be offset from each other, such that for different traverses the analogue probe obtains measurement data within its preferred measurement range for different parts of the object, along the same nominal measurement line on the surface of the object. In other words, the course of motion could be configured such that the preferred measuring range traverses across the object along the nominal measurement line, at least twice, each traverse being substantially parallel to each other but at different nominal heights to the surface of the object. The nominal height could increase over successive traverses. Preferably, the nominal height decreases over successive traverses.

Accordingly, the course of motion could be configured such that at least a first and second traverses are performed, and in which during the second traverse the analogue probe obtains measurement data within its preferred measurement range for at least a part of the object for which data was obtained outside of the probe's preferred measurement range during the first traverse.

As mentioned above, the position of the analogue probe's preferred measurement range above the surface of the object can be different for different traverses. The position of the analogue probe's preferred measurement range relative to the surface of the object could rise over successive traverses. Preferably, the position of the analogue probe's preferred measurement range relative to the surface of the object falls over successive traverses. The position could be measured between a reference point with respect to the preferred measuring range (e.g. a point within the preferred measuring range, such as the mid-point of the preferred measuring range) and the surface of the object (e.g. the nominal surface of the object). Accordingly, for instance, preferably the line along which the centre of the preferred measuring range follows for each pass could, on average, progressively fall (e.g. get closer to/penetrate deeper into) with respect to the surface of the object over successive traverses. This could happen in a step-by-step manner, e.g. at the end of each traverse.

The course of relative motion can be configured such that the difference between previous and subsequent traverses is sufficiently small such that if along the previous traverse no surface measurement data was obtained, the subsequent traverse will not cause the analogue probe to obtain object surface measurement data that exceeds its entire measurement range, and for example will not cause the analogue probe to obtain data beyond its preferred measuring range. Optionally, traverses are offset from each other in steps that are no bigger than, and for instance are smaller than, the entire measurement range of the probe. For example, traverses can be offset from each other in steps that are no bigger than, and for instance are smaller than, the preferred measuring range of the probe.

Surface measurement data obtained within the preferred measuring range from different traverses can be collated so as to form a measurement data set which represents the surface of the object along the nominal measurement line. As mentioned above, the course of motion can be configured such that for different traverses the analogue probe obtains measurement data within its preferred measurement range for different parts of the object, along the same nominal measurement line on the surface of the object. Preferably, the course of motion is configured such that portions of the surface for which measurement data is obtained within the preferred measurement range overlap between successive passes. In this case, the measurement data set could represent a continuous length of the surface along the nominal measurement line, and preferably represent the surface along the entire length of the nominal measurement line. However, it might be that the portions do not overlap which could therefore mean that might be gaps in the measurement data set.

The nominal surface shape of the object might not be known. The nominal surface shape of the object could be known. In this case the shape of the measurement path across the object can be configured to be substantially parallel to nominal surface shape. That is the path across the object the preferred measurement range is configured to take can be configured to be substantially parallel to the nominal surface shape.

The analogue probe could be a non-contact analogue probe, for instance an optical, capacitance or inductance probe. In this case, the preferred measurement range could be a distance or separation range between a part of the analogue probe (e.g. the workpiece sensing part) and the workpiece surface. Accordingly, the preferred measurement range could comprise upper and lower boundaries or thresholds relating to maximum and minimum probe-object separations. The analogue probe can be a contact analogue probe. For instance, the analogue probe could be a contact analogue probe with a deflectable stylus for contacting the object. In this case, the preferred measurement range can be a preferred stylus deflection range. Accordingly, the preferred measurement range could comprise upper and lower boundaries or thresholds relating to maximum and minimum stylus deflections.

The object could be an object that was (and/or is to be) machined on the machine on which the analogue probe is mounted. Accordingly, the method could comprise, the same machine tool machining the object, for example prior to the above described measuring steps. Optionally machining could take place after the above described measuring steps. Such post-measurement machining could take place on the same machine tool on which the measurement occurred. Such post-measurement machining could be based on measurement data obtained during the above described measurement steps. The machine tool could be a cutting machine, such as a metal cutting machine.

The analogue probe could be a sealed analogue probe. That is the analogue probe could be sealed so as to protect internal sensor componentry from external contaminants. For instance, the probe could comprise a probe body which houses a sensor for either directly or indirectly measuring the surface of an object, in which the sensor is sealed from external contaminant. For instance, in the case of a contact probe, the probe could comprise a probe body, a stylus member and a sensor for measuring displacement of the stylus member relative to the housing, in which at least a first compliant sealing member is provided which extends between the probe body and relatively moveable stylus member, such that the sensor is contained within a sealed chamber and thereby sealed from external contaminants.

The object can be a blade. For instance, the blade could be a blade of a turbine engine.

Accordingly, this application describes a method of scanning an object using an analogue probe mounted on a machine tool, the analogue probe having a preferred measurement range, the method comprising: performing a scanning measurement operation which comprises moving the object and analogue probe relative to each other so that the analogue probe obtains scanned measurement data along a nominal measurement line on the surface of the object, in which some of the data obtained during the scanning measurement operation along the nominal measurement line is within the analogue probe's preferred measurement range and some is outside the probe's preferred measurement range.

According to a second aspect of the invention there is provided a computer program comprising instructions which when executed by a machine tool apparatus causes the machine tool apparatus to perform the above described method.

According to a third aspect of the invention there is provided a computer readable medium comprising instructions which when executed by a machine tool apparatus causes the machine tool apparatus to perform the above described method.

According to a fourth aspect of the invention there is provided a machine tool apparatus comprising a machine tool, an analogue probe mounted on the machine tool, and a controller configured to control the relative movement of the analogue probe and an object to be measured so as to so as to collect scanned measurement data along a nominal measurement line on the surface of the object, and in particular so as to control the analogue probe and/or object in accordance with a course of relative motion such that the position of the preferred measuring range relative to the surface of the object is controlled in a manner that, based on assumed properties of the surface of the object, will cause the analogue probe to obtain data within its preferred measuring range, as well as to exceed its preferred measuring range, along the nominal measurement line on the surface of the object.

Figure 2A:
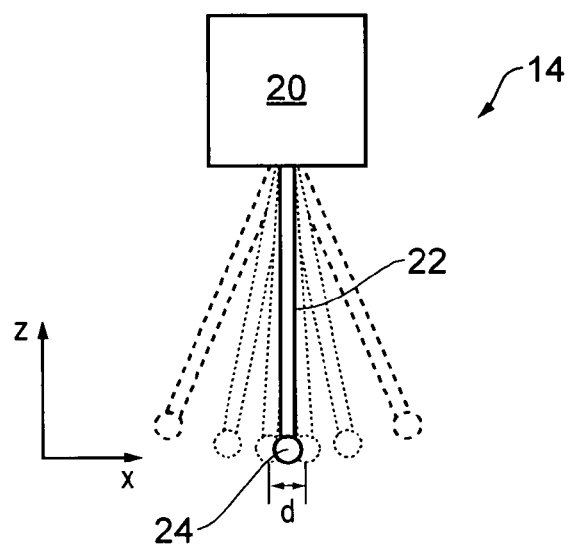
Figure 2B:
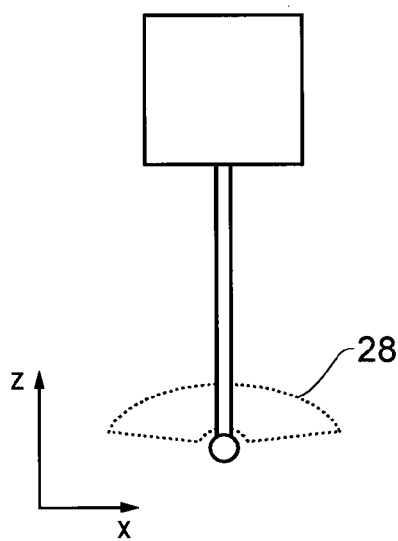
Figure 2C:
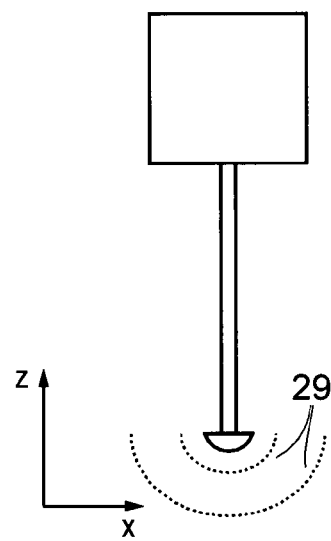
Figure 3:
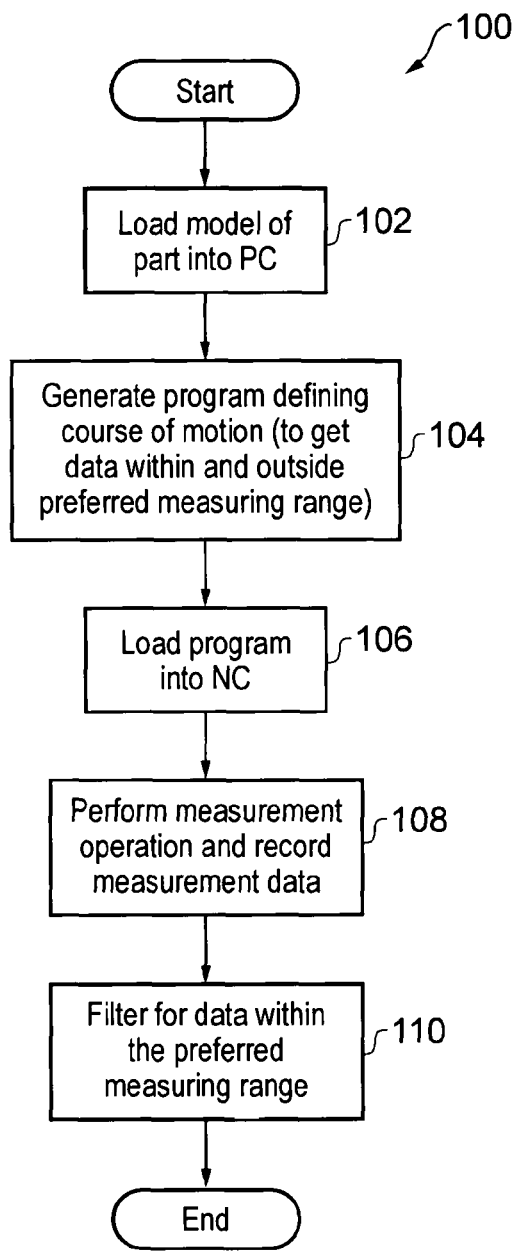
Figure 4:
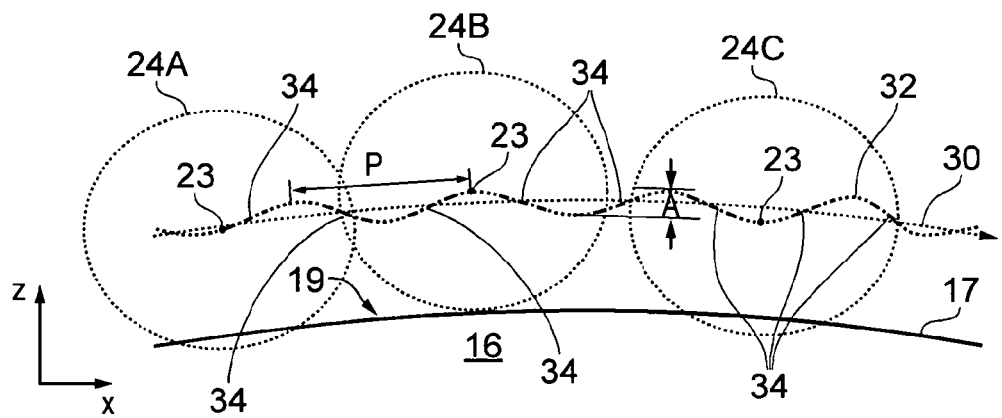
Figure 5A:
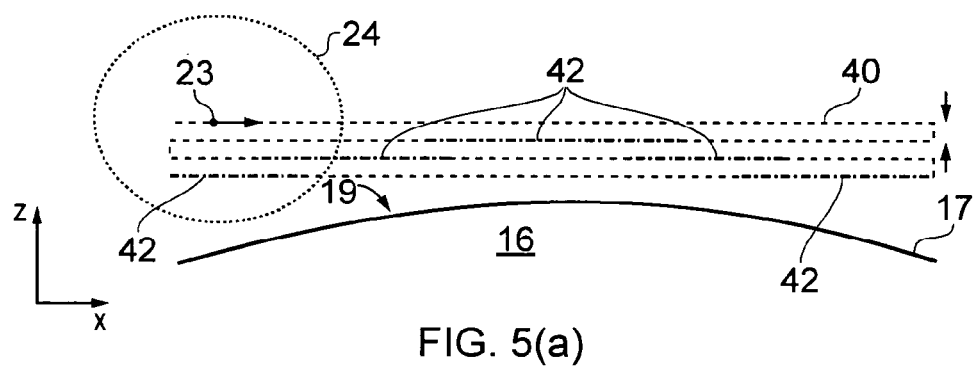
Figure 5B:
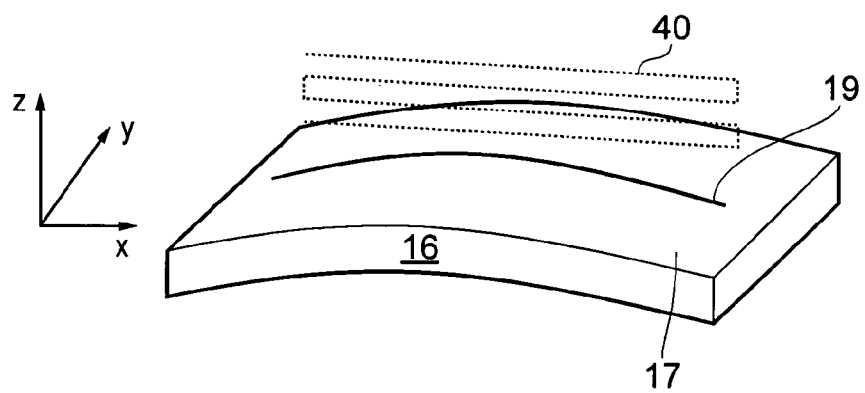
Figure 6A:
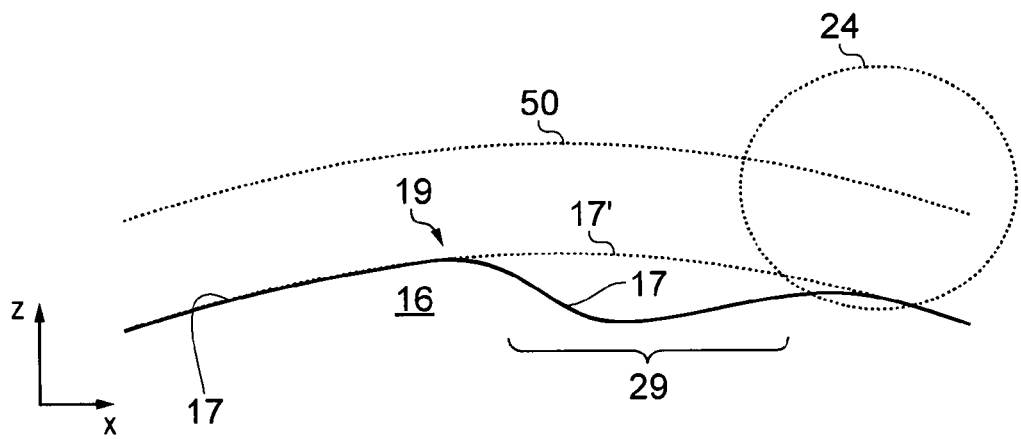
Figure 6B:
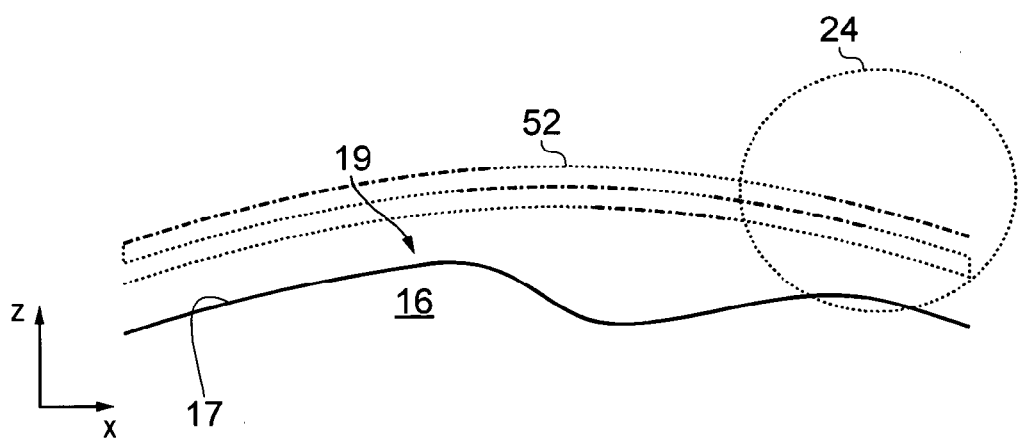
Figure 7:
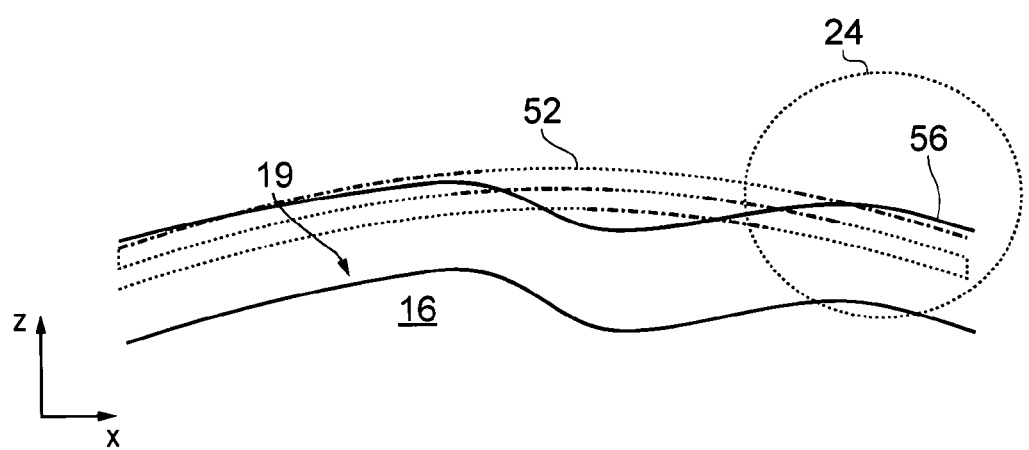

Embodiments of the invention will now be described, by way of example only, with reference to the accompanying drawings in which:

FIG. 1 is a schematic diagram showing the system architecture for a machine tool;

FIGS. 2(a) to (c) are schematic diagrams illustrating the measurement range of analogue measurement probes;

FIG. 3 is a system flow chart illustrating the flow of control during a measurement operation according to an embodiment of the invention;

FIG. 4 schematically illustrates the nominal path of a stylus tip according to a first embodiment of the invention;

FIGS. 5(a) and 5(b) schematically illustrate side and isometric views of a nominal path of a stylus tip according to a second embodiment of the invention;

FIGS. 6(a) and 6(b) respectively illustrate nominal path of a stylus tip according to a third and fourth embodiments of the invention; and FIG. 7 illustrates nominal paths of a stylus tip according to a preliminary scan and a subsequent scan generated based on data obtained during the preliminary scan, according to a further embodiment of the invention.

Referring to FIG. 1, there is shown a machine tool apparatus 2 comprising a machine tool 4, a controller 6, a PC 8 and a transmitter/receiver interface 10. The machine tool 4 comprises motors (not shown) for moving a spindle 12 which holds an analogue probe 14 relative to a workpiece 16 located on a table 15. The location of the spindle 12 (and hence the analogue probe 14) is accurately measured in a known manner using encoders or the like. Such measurements provide spindle position data defined in the machine co-ordinate system (x, y, z). A numerical controller (NC) 18 (which is part of the controller 6) controls x, y, z movement of the spindle 12 within the work area of the machine tool and also received data relating to the spindle position.

As will be understood, in alternative embodiments relative movement in any or all of the x, y and z dimensions could be provided by movement of the table 15 relative to the spindle. Furthermore, relative rotational movement of the analogue probe 14 and workpiece 16 could be provided by a part of the spindle 12 (e.g. a rotating/articulated head mounted on the spindle) and/or a part of table 15 (e.g. a rotary table). Furthermore, movement might be restricted to fewer dimensions, e.g. only x, and/or y. Further still, the embodiment described comprises a cartesian machine tool, whereas will be understood this need not necessarily be the case and could be instance be a non-cartesian machine tool. Further still, many other different types of machine tools, including lathes, and parallel-kinematic machines, and robot arms are known and could be used with the invention.

In the embodiment described, the analogue probe 14 is a contact analogue probe which comprises a probe body 20, a workpiece contacting stylus 22 extending from the probe body 20, and has a surface detection region in the form of a workpiece contacting tip 24 (which in this case in the form of a spherical stylus ball) at the distal end of the stylus 22. The analogue probe 14 measures deflection of the stylus 22 in a probe geometry system (a, b, c). (However, as will be understood, this need not necessarily be the case, and for instance the analogue probe could measure deflection in only 1 or 2 dimensions, or even provide an output indicative of the extent of deflection, without any indication of the direction of deflection). The probe 14 also comprises a transmitter/receiver (not shown) that wirelessly communicates with the transmitter/receiver interface 10 (e.g. via a radio, optical or other wireless transmission mechanism).

As mentioned above, analogue measurement probes have a limited measurement range. For instance with regard to contact analogue probes, they can have a physical maximum amount by which they can be deflected in the x, y and z dimensions. Not only this, but it can be that the probe is configured such that it works optimally within a certain sub-range of the maximum physical range. For instance, FIG. 2(a) illustrates the analogue probe of FIG. 1, and the solid line represents the position of the stylus 22 at a rest (e.g. undeflected) position. The outermost stylus positions shown in dashed lines represent the maximum physical deflection of the stylus in the x-dimension. However, it could be that the probe is configured such that it is most accurate when the stylus is deflected by an amount less than the maximum physical deflection. It could also be that the probe is configured such that it is most accurate when the stylus is deflected by a minimum lower threshold. For instance, the analogue probe 14 could have a preferred measurement range, the upper and lower boundaries of which are shown by stylus positions shown in FIG. 2(a) as dotted lines. Accordingly, as can be seen there is a dead space 'd' (in the x-dimension) in the middle close to the stylus' rest position which is outside the preferred measuring range.

As will be understood, the same will also be the case with deflection in the y-dimension. Furthermore, in the described embodiment there is also a maximum physical deflection range in the z-axis as well as a sub-range of z-axis deflections (a preferred measurement range) within which the probe is configured to provide the most accurate results.

The dotted line 28 shown in FIG. 2(b) schematically illustrates the scope of the analogue probe's 14 preferred measurement range taken in the x and z dimensions. As will be understood, such a range actually extends in a three dimensions, and hence is actually approximately the shape of a squashed hemisphere with a small hole cut out in the middle.

The dotted lines of FIG. 2(c) also schematically illustrate the preferred measurement range for a non-contact probe, such as an inductance probe. The inner and outer dotted lines represent the minimum and maximum probe/workpiece separation boundaries for optimum measuring performance. As will be understood, the preferred measuring range shown for the non-contact probe could be the entire measuring range or only a subset of the entire measuring range for the probe. As will be understood, the entire measuring range could be considered to be what can be referred to as the non-contact probe's surface detecting region.

As will be understood, the size of the preferred measuring range will vary from probe to probe. For a contact analogue probe, it could be for example not more than +/−0.8 mm in any given dimension, for example not more than +/−0.725 mm in any given dimension, for instance not more than +/−0.5 mm in any given dimension, for example in some circumstances not more than +/−0.3 mm in any given dimension (taken from the stylus rest position). Of course, there might also be a dead-zone immediately around the stylus position through which the stylus has to be deflected beyond before it enters the preferred measuring range, which could be for example not less than +/−0.2 mm in any given dimension from the stylus rest position, for instance not less than +/−0.1 mm in any given dimension from the stylus rest position, e.g. not less than +/−0.125 mm in any given dimension (again, measured from the stylus rest position).

As described above, the present invention departs from the traditional view that the probe must be maintained such that along the nominal measurement line on the surface of the object the probe always collects data within its preferred measurement range. Rather, as is clear from the embodiments described below, the invention enables measurements along the nominal measurement line to be obtained both within and outside the probe's preferred measurement range and then subsequently filtered as required.

FIG. 3 illustrates the general procedure 100 involved according to one embodiment of the invention. The method starts at step 102 at which point a model of the part to be measured is loaded into the PC 8. As explained in more detail below, this step need not necessarily be performed in embodiments in which the workpiece to be measured is unknown. At step 104 a program defining a course of motion for the analogue probe 14 to obtain scanned measurement data of the workpiece 16 is generated. In the embodiment described, the course of motion is configured such that the analogue probe will obtain measurement data both within and outside its preferred measurement range along a nominal measurement line on the surface of the object. As will be understood, in embodiments in which the workpiece 16 can be moved as well as, or instead of the analogue probe 14 (e.g. by virtue of a movable table 15), then the program can also define a course of motion of the workpiece 16. In other words, step 104 comprises planning the relative course of motion between the analogue probe 14 and the workpiece 16 so that the analogue probe 14 can collect scanned measurement data regarding the workpiece 16. At step 106 the program is loaded into the NC 18 via the API 26. Step 108 involves performing the measurement operation and recording measurement data. In particular, performing the measurement operation comprises the NC 18 interpreting the program's instructions and generating motor control signals which are used to instruct the machine tool's 4 motors (not shown) so as to move the analogue probe 14 in accordance with the predetermined course of motion. Recording measurement data comprises a number of procedures. In particular, spindle position data (x, y, z) (which as mentioned above is provided by encoders on the machine tool 4) is passed to the PC 8 via the NC 18. Furthermore, probe deflection data (a, b, c) (which as mentioned above is obtained by the analogue probe) is also passed to the PC 8 via the probe transmitter/receiver interface 10. The PC 8 combines the spindle position data (x, y, z) and the probe deflection data (a, b, c) to provide a set of measurements that define the position of a surface within the machine co-ordinate geometry.

Step 110 comprises the PC 8 filtering the recorded measurement data. In the particular embodiment described, this comprises the PC 8 filtering the recorded measurement data for measurement data that was obtained within the analogue probe's preferred measurement range. As will be understood, the data could be filtered in other ways, for instance, for measurement data that was obtained outside the analogue probe's preferred measurement range. As will be clear from the different embodiments described above, how the filtering is performed, and the end result obtained varies from embodiment to embodiment.

For instance (and as explained in more detail below), FIG. 4 illustrates a technique according to the invention for measuring a known part in which the stylus tip is moved across the workpiece 16 in an undulating manner so as to collect data within and outside its preferred measurement range. FIG. 5 illustrates a technique for measuring an unknown part by traversing back and forth across the same nominal measurement line on the surface of the part at different nominal stylus tip positions, and FIG. 6 illustrates a similar technique but which is used for measuring a known part.

Referring first to FIG. 4, this illustrates that the stylus tip 24 could be configured such that its gross movement (illustrated by feint dotted line 30) is generally parallel to surface 17 of the workpiece 16. However, as illustrated by the dark dotted line 32, the relative course of motion of the analogue probe and workpiece 16 is configured such that the nominal stylus tip centre point 23 is caused to undulate toward and away from the surface as it travels along a nominal measurement line 19 on the surface 17 of the object 16. The dotted circles 24A, 24B, 24C represent the nominal position of the stylus tip at three different points along the nominal measurement line on the surface of the object 16. As will be understood, these stylus tip positions 24A, 24B, 24C are nominal in that this is where the position the tip would be in at those points along the nominal measurement line if the object was not there. The nominal measurement line 19 (which is more easily seen in FIG. 5(*b*) which illustrates a different embodiment of the invention) is the line on the surface 17 of the object on which measurement data is to be gathered. The line is nominal in that this is the expected line of measurement on the object. As will be understood, the actual line of measurement may be different if the location and/or material condition of the object 16 is different to what is expected.

Such undulation of the nominal stylus tip centre point 23 could be achieved for instance by varying the probe's stand-off distance relative to the surface 17 of the workpiece 16 as it traverses across the workpiece 16. Optionally, if the probe were mounted on an articulated head, then this could be achieved by varying the angular position of the probe about at least one of the head's rotational axes.

In the embodiment described, the course of motion is configured such that the nominal undulating motion 32 is configured such that for a perfect workpiece 16 (i.e. in which the actual workpiece corresponds exactly to the model workpiece) the probe's 14 stylus 22 is configured to oscillate between being over and under deflected as it travels along the surface 17 of the workpiece 16, in between which the analogue probe 14 collects measurement data within its preferred measurement range. For instance as shown in FIG. 4 at nominal stylus tip position 24A, the stylus deflection is such that the probe 14 obtains measurement data within is preferred measurement range whereas nominal stylus tip positions 24B and 24C the stylus is respectively under and over deflected. Accordingly, it can be seen from the embodiment of FIG. 4 that as the stylus tip 24 travels across the surface only select portions (illustrated by the dashed and dotted segments 34) where the stylus deflection is within its preferred deflection range and hence only select portions of the data obtained from the measurement probe will be obtained within its preferred measurement range.

As will be understood, the amplitude A of undulating position of the stylus centre tip is greatly exaggerated in FIG. 4 so as to aid illustration. As will be understood, the extent of the amplitude A will vary depending on many factors including the extent of the preferred measurement range, the extent the actual physical range of a deflectable stylus, the nominal workpiece dimensions and the expected level of variation in surface position. Nevertheless, by way of example only, the amplitude A can be as less than 5 mm, for example less than 2 mm, and for example greater than 0.5 mm, for example 1 mm. Furthermore, the pitch P of the undulating motion will vary depending on many factors, such as those mentioned above and for example the density of measurements required, and for example can be less than 100 mm and for example greater than 10 mm, for example 50 mm.

Although the method of FIG. 4 results in only some of the measurement data being obtained within the probe's preferred measurement range, this method of measuring can help to ensure that at least some measurement data is obtained within the preferred measurement range despite the material condition of the workpiece 16 being different to what is expected. For instance, with reference to FIG. 4, if the actual position of the workpiece 16 is slightly offset such that its surface 17 is located a fraction closer to the nominal probe tip centre line 32, then measurement data will still be obtained, but rather than being obtained at the points illustrated by dashed and dotted portions 34, the preferred measurement data will be obtained at the peaks of the nominal probe tip centre line 32.

FIGS. 5(*a*) and (*b*) illustrate an alternative embodiment in which the part to be measured is unknown. In this case, no model of the part is loaded into the PC at step 102, and step 104 comprises generating a standard course of motion which can be used to obtain measurement data about the unknown part. The part could be unknown in that its shape and dimensions of at least one feature are unknown and are to be determined. In the embodiment described, the predetermined course of motion is configured such that the nominal probe tip centre 23 moves back and forth along the same nominal measurement line 19 on the surface 17 of the object 16, but at different nominal distances from the surface 17, as illustrated by dotted line 40. In the embodiment shown, each traverse across the surface of the object is generally in a straight line, and also constrained within one plane, however as will be understood this need not necessarily be the case. Indeed, for example, each traverse could involve causing the nominal stylus tip centre point to undulate much like that shown in FIG. 4. Furthermore, the path of each traverse could meander in a sideways direction, e.g. in a side-to-side motion. Furthermore, the predetermined course of motion need not necessarily move the nominal probe tip centre in a back and forth manner. For example, each traverse could take place in the same direction. Furthermore, each traverse could, for example, comprise moving the nominal probe tip centre in a winding (e.g. spiral) manner across the surface of the object.

As shown, the position of the analogue probe's preferred measuring range will fall relative to the surface 17 of the object 16 over successive traverses. In particular its average position along the nominal measurement line above the surface falls over successive traverses. In the embodiment described, on the first traverse, the stylus tip 24 does not deflect enough to enter its preferred deflection range and hence no data is obtained within the preferred measurement range. On the second traverse, the crest of the surface 17 causes the stylus tip 24 to deflect within its preferred deflection range and so measurement data is obtained within the probe's preferred measurement range for a portion of the pass, illustrated by the dashed and dotted portion 42. As can be seen for the third and forth traverses, again the stylus is deflected within its preferred measurement range so as to obtain measurement data within the probe's preferred measurement range for portions 42 of the passes. During step 110, these portions 42 of measurement data that have been obtained within the preferred measurement range can be filtered from the entire measurement data set and collated so as to provide a new set of measurement data regarding the object, all of which was obtained within the analogue probe's 14 preferred measurement range. In the embodiment shown, the nominal course of motion of the probe tip centre 23 is such that the portions 42 of data obtained within the preferred measurement range overlap between successive passes. However, this need not necessarily be the case, which would therefore mean that there could be gaps in any final data set that is created from data obtained within the analogue probe's 14 preferred measurement range. Furthermore, as with FIG. 4, the step toward the workpiece between each pass is exaggerated to aid illustration. The actual size of the step varies depending on a number of factors, including the measuring range of the probe but typically could for instance be as small as 0.2 mm and as large as 0.8 mm. Furthermore, although it is shown that the nominal stylus tip centre point steps toward the object after each traverse, this need not necessarily be the case. For instance, the nominal stylus tip centre point could nominally get progressively closer along the length of the pass such that it gradually approaches the object along each traverse.

In the embodiment described in connection with FIG. 5, the analogue probe's stylus deflects beyond its preferred measurement range, but never deflects beyond its maximum deflection threshold. However, in other embodiments it might be that the shape and dimensions of the object, and/or the predetermined path of relative movement, is such that the analogue probe is at risk of its stylus deflecting beyond its maximum deflection threshold. In this case, during a scanning operation, the analogue probe's output can be monitored to check for such a situation and take corrective action. Such corrective action could be to halt and abort the scanning operation. Optionally, such corrective action could be to adjust the predetermined path of relative movement so that deflection of the stylus beyond its maximum deflection threshold is avoided. For instance, at the end of each traverse, it could be determined if on the next, or a future, traverse the stylus is likely to deflect beyond its maximum deflection threshold, and if so then adjust the predetermined path of relative movement.

Such a rastering approach adopted described for unknown parts in connection with FIG. 5 can also be useful even if the nominal shape of the workpiece is known. For instance, with reference to FIG. 6(*a*) there is shown a situation in which the actual surface shape 17 of the workpiece 16 deviates from its nominal surface shape 17' in that it has an unexpected dip 27. Accordingly, if the stylus tip 24 were to follow a path 50 substantially parallel to the expected nominal surface shape 17, then it would result in no measurement data being obtained within the analogue probe's preferred measurement range for the dipped part of the surface. However, as illustrated in FIG. 6(*b*) using a path 52 which adopts the rastering approach enables the measurement data obtained along the path 52 that was obtained within the analogue probe's preferred measurement range (such data being illustrated by dash and dot portions 54) to be filtered and collated, so as to thereby provide measurement data that was obtained within the analogue probe's preferred measurement range for the entirety of the nominal measurement line 19 for the actual surface shape 17.

As will be understood, the filtering could be achieved in many different ways. For instance, it could be done at source, in that only data obtained within the probe's preferred measurement range is reported by the analogue probe and/or receiver/transmitter interface 10. Optionally, all the data from the analogue probe is reported, by only those measurements which were obtained within the analogue probe's preferred measurement range are combined with spindle (i.e. analogue probe) position data. In an alternative embodiment, all analogue probe data is combined with spindle position data, and then the combined data is subsequently filtered to remove the combined data which contains analogue probe data outside the preferred measurement range.

The above described embodiments filter for and collate data that was obtained within the analogue probe's preferred measurement range. As will be understood, this need not necessarily be the case and instead for instance a method according to the invention could filter for and collate data outside the preferred measurement range, or indeed only report data that it outside the preferred measurement range.

This might be useful for instance when it is only important to know when a part is out of tolerance (and possibly for example by how much).

In the embodiments described above, the path along which the analogue probe and object are moved relative to each other is predetermined. In particular, the entire path is determined before the scanning operation is begun. However, this need not necessarily be the case. For instance, with respect to the embodiments described in connection with FIGS. 5 and 6, the path of relative movement could be generated on a traverse-by-traverse basis. For example, a first traverse along the nominal measurement line could be completed, and if it is determined that not all the measurement data obtained along the nominal measurement line was within the analogue probe's preferred measurement range, then a subsequent traverse could be performed in which the position of the probe's preferred measurement range is at a different position with respect to the object along the traverse along the nominal measurement line. This process could be continually repeated until measurement data within the analogue probe's preferred measurement range has been obtained along the entire length of the nominal measurement line.

In other embodiments, the method of the invention can comprise generating and executing (e.g. as part of a second scanning operation) a new course of relative movement of the analogue probe and object based on the measurement data obtained during the previous scanning operation (e.g. during a scanning operation according to the embodiments of FIGS. 4, 5 and 6). The new course of relative movement can comprise the analogue probe traversing substantially the same line of measurement across the surface of the object. However, in this case the relative movement can be controlled such that the relative position of the analogue probe and object is such that the analogue probe obtains measurements within its preferred measurement range for a greater proportion of the measurement path than for the previous measurement of the object. In particular, the new path of relative movement for the analogue probe and object to follow can be configured such that the analogue probe obtains measurement data within its preferred measurement range along substantially the entire length of the same nominal line.

This is the case shown in FIG. 7, which is a replication of FIG. 6(*b*), except that solid line 56 illustrates the path of the probe tip centre which was generated from the data obtained during the scan illustrated by the dotted line 52.

The above described scanning operations can be performed at high speed (e.g. with the workpiece sensing part (e.g. the stylus tip 24) and object travelling relative to each other at least at 16 mm/s, preferably at least at 25 mm/s, more preferably at least at 50 mm/s, especially preferably at least at 100 mm/s, for example at least at 250 mm/s) because it doesn't matter whether the probe 14 obtains data outside its preferred measuring range.

The invention claimed is:

1. A method of scanning an object, using a contact analogue probe that comprises a deflectable stylus for contacting the object and that is mounted on a machine tool, to collect scanned measurement data along a nominal measurement line on a surface of the object, the analogue probe having a preferred measuring range, the method comprising:

controlling the contact analogue probe and/or the object to perform a scanning operation in accordance with a course of relative motion, the course of relative motion being configured such that, based on assumed properties of the surface of the object, the contact analogue probe will be caused to obtain data within the preferred measuring range and caused to go outside the preferred measuring range, along the nominal measurement line on the surface of the object.

2. The method as claimed in claim 1, further comprising collecting and outputting scanned measurement data obtained within the preferred measuring range as a measurement of the object.

3. The method as claimed in claim 2, in which the collecting and outputting comprises filtering the scanned measurement data obtained from the contact analogue probe so as to obtain, and provide as the measurement of the object, select object measurement data obtained from within the preferred measuring range.

4. The method as claimed in claim 1, in which the contact analogue probe proceeds in a manner that, based on the assumed properties of the surface of the object, causes a position of the preferred measuring range to repeatedly rise and fall relative to the surface of the object as the contact analogue probe moves along the nominal measurement line.

5. The method as claimed in claim 1, in which the contact analogue probe is maintained in a position sensing relationship with the surface of the object as the contact analogue probe is moved so as to collect data along the nominal measurement line.

6. The method as claimed in claim 1, in which the course of relative motion is configured such that, during the scanning operation, the preferred measuring range traverses across the object along the nominal measurement line a plurality of times.

7. The method as claimed in claim 6, in which for different traverses the contact analogue probe obtains measurement data within the preferred measuring range for different parts of the object along the nominal measurement line.

8. The method as claimed in claim 6, in which the form of a route the preferred measuring range takes relative to the surface is substantially the same for successive traverses, but in which height of the route from the surface at at least one point along the nominal measurement line is different for different traverses.

9. The method as claimed in claim 6, in which surface measurement data obtained within the preferred measuring range from different traverses is collated so as to form a measurement data set representing the surface of the object along the nominal measurement line.

10. The method as claimed in claim 1, comprising generating and executing, as part of a second scanning operation, a new course of relative movement of the contact analogue probe and the object.

11. The method as claimed in claim 10, in which the new course of relative movement comprises the contact analogue probe traversing substantially the same line of measurement across the surface of the object, but in which the relative movement is controlled such the contact analogue probe obtains measurements within the preferred measuring range for a greater proportion of the new course of relative movement than for that of the scanning operation.

12. The method as claimed in claim 1, in which the preferred measuring range is a preferred range of deflection of the contact analogue probe.

13. A non-transitory computer readable storage medium storing a program comprising instructions that, when executed by a machine tool apparatus, cause the machine tool apparatus to perform the method of claim 1.

14. A machine tool apparatus, comprising:
a machine tool, a contact analogue probe having a deflectable stylus mounted on the machine tool, and a controller configured (i) to control relative movement of the contact analogue probe and an object to be measured so as to collect scanned measurement data along a nominal measurement line on a surface of the object, and (ii) to control the contact analogue probe and/or the object in accordance with a course of relative motion such that a position of a preferred measuring range of the contact analogue probe relative to the surface of the object is controlled in a manner that, based on assumed properties of the surface of the object, will cause the contact analogue probe to obtain data within the preferred measuring range and to exceed the preferred measuring range, along the nominal measurement line on the surface of the object.

15. A method of scanning an object using an analogue probe mounted on a machine tool, the analogue probe having a preferred measuring range, the method comprising:

performing a scanning measurement operation which comprises moving the object and the analogue probe relative to each other so that the analogue probe obtains scanned measurement data along a nominal measurement line on a surface of the object, in which some of the scanned measurement data obtained during the scanning measurement operation along the nominal measurement line is within the preferred measuring range and some is outside the preferred measuring range.

16. A non-transitory computer readable storage medium storing a program comprising instructions that, when executed by a machine tool apparatus, cause the machine tool apparatus to perform the method of claim 15.

17. A method of scanning an object, using a contact analogue probe that comprises a deflectable stylus for contacting the object and that is mounted on a machine tool, to collect scanned measurement data along a nominal measurement line on a surface of the object, the analogue probe having a preferred measuring range, the method comprising:

controlling the contact analogue probe and/or the object to perform a scanning operation in accordance with a course of relative motion, the course of relative motion being configured such that, based on assumed properties of the surface of the object, the contact analogue probe is expected to obtain data within the preferred measuring range and it is expected that the contact analogue probe will go outside the preferred measuring range, along the nominal measurement line on the surface of the object.

18. A non-transitory computer readable storage medium storing a program comprising instructions that, when executed by a machine tool apparatus, cause the machine tool apparatus to perform the method of claim 17.

19. A machine tool apparatus, comprising a machine tool, a contact analogue probe having a deflectable stylus mounted on the machine tool, and a controller configured (i) to control relative movement of the contact analogue probe and an object to be measured so as to collect scanned measurement data along a nominal measurement line on a surface of the object, and (ii) to control the contact analogue probe and/or the object in accordance with a course of relative motion such that a position of a preferred measuring range of the contact analogue probe relative to the surface of the object is controlled in a manner that, based on assumed properties of the surface of the object, the contact analogue probe is expected to obtain data within the preferred measuring range and it is expected that the contact analogue probe will exceed the preferred measuring range, along the nominal measurement line on the surface of the object.

* * * * *